United States Patent
Lauer

(10) Patent No.: US 10,014,930 B2
(45) Date of Patent: *Jul. 3, 2018

(54) MULTIPLE MODEM COMMUNICATION SYSTEM AND METHOD FOR A MOBILE PLATFORM

(71) Applicant: GOGO LLC, Chicago, IL (US)

(72) Inventor: Bryan Adrian Lauer, Hinckley, IL (US)

(73) Assignee: GOGO LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/223,511

(22) Filed: Jul. 29, 2016

(65) Prior Publication Data

US 2016/0337029 A1    Nov. 17, 2016

Related U.S. Application Data

(63) Continuation of application No. 14/307,228, filed on Jun. 17, 2014, now Pat. No. 9,408,129.

(51) Int. Cl.
*H04W 36/24*    (2009.01)
*H04B 7/185*    (2006.01)
(Continued)

(52) U.S. Cl.
CPC ......... *H04B 7/18541* (2013.01); *H04B 7/185* (2013.01); *H04B 7/18508* (2013.01);
(Continued)

(58) Field of Classification Search
None
See application file for complete search history.

(56) References Cited

U.S. PATENT DOCUMENTS

| 3,340,531 | A | 9/1967 | Kefalas et al. |
| 5,557,656 | A | 9/1996 | Ray et al. |

(Continued)

FOREIGN PATENT DOCUMENTS

| EP | 0 902 551 A2 | 3/1999 |
| EP | 1 976 152 A1 | 10/2008 |

(Continued)

OTHER PUBLICATIONS

Lemme et al., "Iridium® Aeronautical Satellite Communications," 9 pages (1998).

(Continued)

*Primary Examiner* — Chi H Pham
*Assistant Examiner* — Shick Hom
(74) *Attorney, Agent, or Firm* — Marshall, Gerstein & Borun LLP; Randall G. Rueth

(57) ABSTRACT

A system, method, and device to enable communication between a first and second satellite station and a controller of a mobile platform. The controller includes a processor, a first modem facilitating communication with the first satellite station via a first frequency over a first communication link, and a map of the one or more networks of satellite stations including the second satellite station. The controller utilizes the map of the one or more networks of satellite stations to determine the second satellite station for communicating with the controller. A second modem is coupled to the controller and facilitates communication with the second satellite station via a second frequency over a second communication link, wherein the controller is configured to calculate a time to handoff communication with the mobile communicator from the first communication link to the second communication link.

20 Claims, 4 Drawing Sheets

(51) Int. Cl.
  *H04B 17/318* (2015.01)
  *H04W 28/02* (2009.01)
  *H04W 84/12* (2009.01)
  *H04W 88/12* (2009.01)

(52) U.S. Cl.
  CPC ...... *H04B 17/318* (2015.01); *H04W 28/0268* (2013.01); *H04W 36/24* (2013.01); *H04W 84/12* (2013.01); *H04W 88/12* (2013.01)

(56) References Cited

U.S. PATENT DOCUMENTS

| | | |
|---|---|---|
| 5,664,006 A | 9/1997 | Monte et al. |
| 5,722,074 A | 2/1998 | Muszynski |
| 5,956,644 A | 9/1999 | Miller et al. |
| 6,009,328 A | 12/1999 | Muszynski |
| 6,058,307 A | 5/2000 | Garner |
| 6,310,582 B1 | 10/2001 | Uetake et al. |
| 6,628,921 B1 | 9/2003 | Vaddiparty et al. |
| 6,944,450 B2 | 9/2005 | Cox |
| 7,068,625 B1 | 6/2006 | Schindler et al. |
| 7,107,062 B2 | 9/2006 | Cruz et al. |
| 7,187,927 B1 | 3/2007 | Mitchell |
| 7,558,569 B2 | 7/2009 | Chang et al. |
| 7,751,814 B2 | 7/2010 | Cruz et al. |
| 8,169,946 B2 | 5/2012 | Lynch et al. |
| 8,396,483 B2 | 3/2013 | Chater-Lea et al. |
| 8,452,276 B2 | 5/2013 | Lauer |
| 9,408,129 B2 * | 8/2016 | Lauer .................. H04W 36/24 |
| 2002/0068571 A1 | 6/2002 | Ohlsson et al. |
| 2006/0229070 A1 | 10/2006 | de La Chapelle et al. |
| 2006/0229104 A1 | 10/2006 | de La Chapelle et al. |
| 2007/0021117 A1 | 1/2007 | McKenna et al. |
| 2007/0042772 A1 | 2/2007 | Salkini et al. |
| 2007/0060126 A1 * | 3/2007 | Taniguchi ............. H04W 36/32 455/436 |
| 2008/0004016 A1 | 1/2008 | Smee et al. |
| 2008/0159229 A1 | 7/2008 | Kim |
| 2008/0242305 A1 | 10/2008 | Kahlert et al. |
| 2013/0029669 A1 | 1/2013 | Boudreau et al. |
| 2014/0256326 A1 | 9/2014 | Morgan et al. |

FOREIGN PATENT DOCUMENTS

| | | |
|---|---|---|
| EP | 2 568 533 A1 | 3/2013 |
| WO | WO-02/091628 A1 | 11/2002 |

OTHER PUBLICATIONS

McMahon et al., "Measuring Latency in Iridium Satellite Constellation Data Services," 39 pages.

International Search Report and Written Opinion, corresponding International Application No. PCT/US2015/036126, dated Sep. 25, 2015.

European patent application No. 15733591.0, Communication Pursuant to Article 94(3) EPC, dated Jan. 5, 2018.

Office Action in Japanese Application No. 2016-572831 dated Jan. 30, 2018, 18 pages.

* cited by examiner

MULTIPLE MODEM COMMUNICATION SYSTEM AND METHOD FOR A MOBILE PLATFORM

RELATED APPLICATION

This patent application is a continuation patent application that claims the filing benefit of U.S. patent application Ser. No. 14/307,228, filed Jun. 17, 2014; and the contents of which are expressly incorporated herein.

FIELD OF INVENTION

The present disclosure generally relates to telecommunication systems, and more particularly, to a system, method, and device for facilitating communication between a mobile platform and satellite stations within one or more telecommunications networks.

BACKGROUND

The evolution of the wireless internet continues to be driven by the ongoing technical advances in mobile communication. End users now expect wireless access to the internet from essentially any location. While some particular locations pose technical difficulties to providing wireless internet access, for example, within buildings, uninhabited terrain, underground or underwater, and aboard vehicles on land, in the air, and at sea; satellite technology has made wireless access to the internet possible from many of these secluded locations. However, the performance and reliability (i.e., mobile quality of service (QoS)) of wireless communication from many of these remote locations may at times be disappointing to the end user and/or provider.

Commercial air travelers are able to wirelessly access the internet through an aircraft's communication system that interacts with suitable satellite stations during travel. To maintain communications between the passengers and various ground networks, the wireless communications often need to be switched among several satellite stations during the flight. Ineffective switching among the several satellite stations may contribute to intermittent service and dropped connections, which adversely affect the mobile QoS. It is therefore desirable to reduce these disruptions and provide an effective method of maintaining wireless communication between the passengers and the various satellite stations.

SUMMARY OF THE DISCLOSURE

Accordingly, it may be advantageous to create a system and device utilizing multiple communication modems to maintain wireless communication between a mobile platform and a satellite communication network. A mobile communicator coordinates multiple communication links with multiple satellite stations via multiple modems. To ensure the quality of the communication between the mobile platform and the communication network, a controller is configured to maintain a first communication link with a first satellite station via a first modem, determine a second satellite station for communication over a second communication link, and calculate a time to handoff communication from the first communication link to the second communication link.

In one embodiment, a controller for communicating with a first and second satellite station from among one or more networks of satellite stations includes a first modem communicating with the first satellite station via a first frequency over a first communication link, a map of the one or more networks of satellite stations including the second satellite station, and a processor coupled to the first modem. The processor utilizes the map of the one or more networks of satellite stations to determine the second satellite station for communication with the controller, and a second modem coupled to the processor communicates with the second satellite station via a second frequency over a second communication link, wherein the processor is configured to calculate a time to handoff communication from the first communication link to the second communication link and timely initiate, coordinate, execute, and/or instruct the handoff accordingly.

In another embodiment, a mobile communicator enables communication between a mobile platform and a first and second satellite station included among one or more networks of satellite stations. The mobile communicator includes a controller fixedly attached to the mobile platform, wherein the controller includes a processor, a first modem, a second modem, and a memory device. The first modem facilitates communication via a first communication link and a first frequency between the controller and the first satellite station. The mobile communicator further includes a map of the one or more networks of satellite stations that includes the second satellite station stored in the memory device, wherein the controller utilizes the map of the one or more satellite stations to determine the second satellite station for communicating with the controller. The second modem facilitates communication via a second communication link and a second frequency between the controller and the second satellite station, wherein the controller is configured to calculate a time to handoff communication from the first communication link to the second communication link and timely initiate the communication handoff.

In a further embodiment, a mobile communicator for communicating with a first and second satellite station from among one or more networks of satellite stations is attached to a mobile platform. The mobile communicator includes an antenna that facilitates communication between the communicator and the one or more networks of satellite stations, a first modem coupled to the antenna and configured to communicate with the first satellite station over a first frequency, and a memory device storing a map of the one or more networks of satellite stations including the second satellite station. The communicator further includes a first controller coupled to the first modem, wherein the first controller utilizes the map of the one or more networks of satellite stations to determine the second satellite station for communication with the mobile communicator; a second modem configured to communicate with the second satellite station over a second frequency, wherein the first controller is configured to calculate a time to handoff communication from the first modem to the second modem and timely initiate the communication handoff based on the calculated time; and a second controller configured to position the antenna toward the second satellite based on the communication handoff.

In another further embodiment, a method for communicating between a controller mounted to a mobile platform and a pair of satellite stations from among one or more networks of satellite stations includes utilizing a first modem and establishing, via one or more processors, a first communication link between the controller and a first satellite station; utilizing one or more maps of the one or more networks of satellite stations and determining, via one or more processors, a second satellite station for communication with the controller; utilizing a second modem and establishing, via one or more processors, a second communication link between the controller and the second satellite station; calculating, via one or more processors, a time to handoff communication from the first communication link to the second communication link based on the analysis of the one or more communication indicators; preparing the first and second modems for the communication handoff from the first communication link to the second communication link; and initiating the communication handoff based on the calculated time.

BRIEF DESCRIPTION OF THE DRAWINGS

The figures described below depict various aspects of the system, method, and device disclosed herein. It should be understood that the figure depict a particular aspect of the disclosed system, method, and device and that each of the figures is intended to accord with a possible embodiment thereof. Further, wherever possible, the following description refers to the reference numerals included in the following figures in which features depicted in multiple figures are designated with consistent reference numerals.

DETAILED DESCRIPTION

The present invention is directed to a system, method, and device for providing end users, e.g., passengers aboard a mobile platform, with the ability to connect end-user mobile communication devices with a communication network. Although the example mobile platform depicted in the figures is shown as an airplane, it is to be understood that the mobile platform may include a human and/or machine operated land-based transport, sea-based transport, and air-based transport, such as, for example: a vehicle, aircraft, ship, boat, submarine, vessel, automobile, truck, motorcycle, helicopter, train, drone, or other carrier capable of moving about the land, sea, or air. Communication between the end-user devices aboard the mobile platform and the communication network is facilitated, in part, by two communication links to two or more communication satellite stations. More specifically, a mobile communicator is fixedly attached or mounted to the mobile platform and includes at least one controller that is capable of providing in-vehicle connections to end-user devices and preparing, initiating, coordinating, executing, and/or instructing communications transmitted to, and received from, the satellite stations. As further discussed below, the controller employs one or more processors and a pair of modems to facilitate and maintain the wireless communication between the mobile communicator and the communication network. In particular, the controller utilizes one or more maps of satellite stations capable of communicating with the mobile communicator and calculates which satellite station or stations may be capable of communicating with the mobile communicator while the mobile platform is travelling. The controller consecutively hands off or hands over the wireless communication among a series of communication links that are each established between the modems aboard the mobile platform and individual communication satellite stations that are calculated to come into and out of communication range of the travelling mobile platform.

Figure 1:
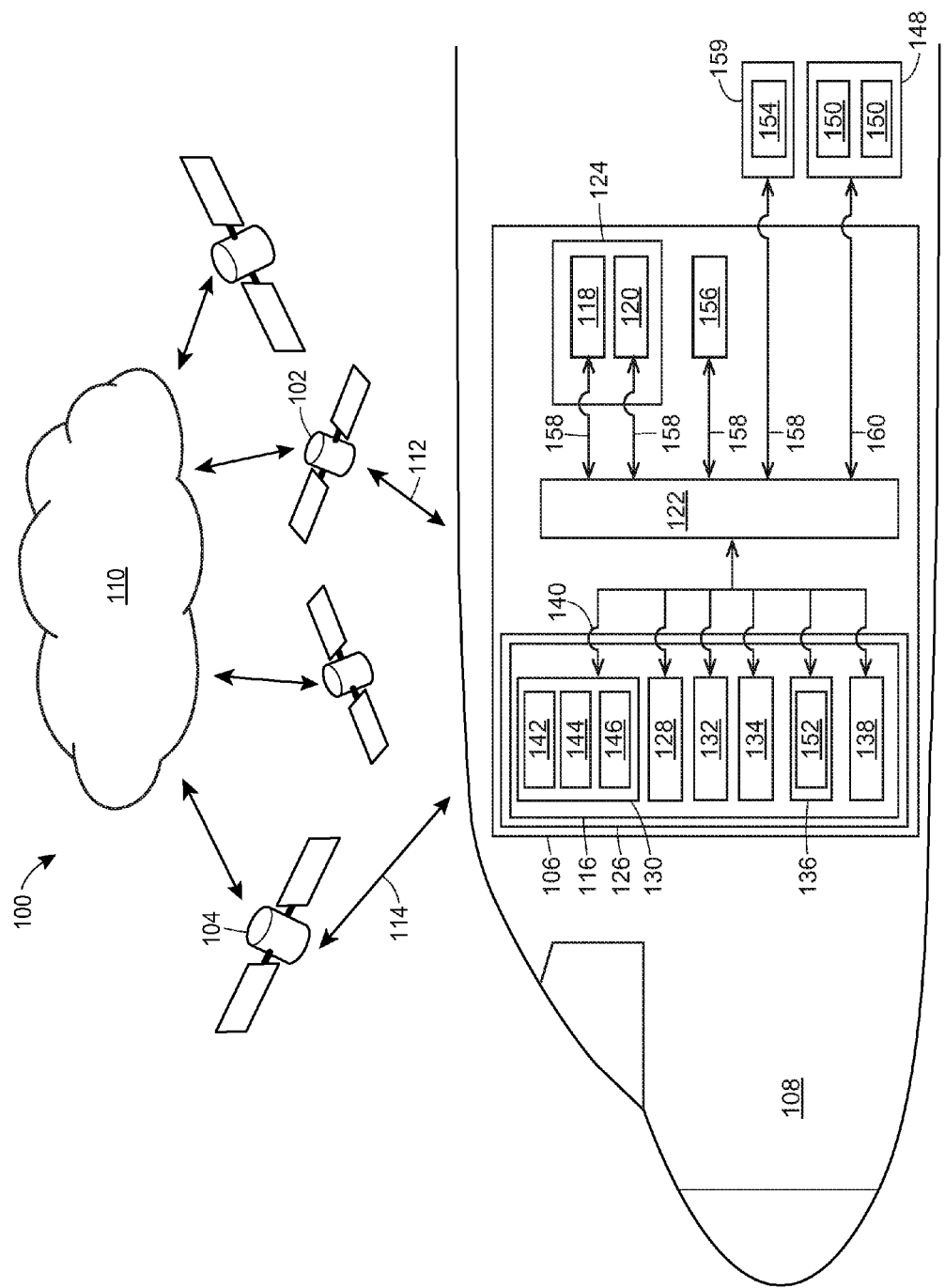
FIG. 1 depicts a block diagram of an example system including a mobile communicator mounted to a mobile platform for communicating with a plurality of satellite stations from one or more networks of satellite stations in accordance with the embodiments described herein.

An example system 100 incorporating the present invention, or an aspect thereof, is shown in FIG. 1. A first satellite station 102 and a second satellite station 104 may be part of or associated with one or more networks or constellations of communication satellite stations moving about Earth at various altitudes and speeds. Each communication satellite station may include a deterministic path or orbit, for example, high earth orbit (HEO), geostationary earth orbit (GEO), medium earth orbit (MEO), and low earth orbit (LEO). The satellite stations 102, 104 are capable of relaying information between a mobile communicator 106 mounted to a mobile platform 108 and a communication network 110.

The communication network 110 may include one or more sub-networks that may or may not communicate with each other in known ways, and may further include a proprietary network, a satellite sub-network, a secure public internet, a virtual private network, a ground network/sub-network, a ground-based wireless network, or some other type of network, such as dedicated access lines, plain ordinary telephone lines, satellite links, and combinations of these, etc. Where the communication network 110 includes the internet, data communications may take place over the network 110 via an internet communication protocol.

Although only two satellite stations 102, 104 are specifically designated in FIG. 1, it is to be understood that additional satellite stations may be utilized by the mobile communicator 106 to facilitate communication with the communication network 110. In particular, the mobile communicator 106 may maintain communication with the network 110 over an extended period of time through a series of individual communication links with separate satellite stations. For example, the mobile communicator 106 is adapted and configured to initiate, coordinate, execute, and/or instruct a handoff of communication from a first communication link 112 with the first satellite station 102 to a second communication link 114 with the second satellite station 104. Additionally, the mobile communicator 106 may facilitate and support bi-directional communication between the communication network 110, which may ultimately include a ground communication network(s), and end-user mobile communication devices 150 (e.g., mobile phone, personal computer (laptop/tablet), wearable computing and/or communicating devices) operatively coupled to a local area network (LAN) and/or a wireless LAN (WLAN) 148 or other type of network configured aboard the mobile platform 108.

The mobile communicator 106 is substantially enclosed within the mobile platform 108 and includes several components fixedly attached or mounted to the mobile platform 108. One or more components of the mobile communicator 106 may be housed within one or more line-replaceable units (LRUs) affixed within the mobile platform 108. The LRU is a modular unit that may include stocked equipment, for example, communications equipment or other auxiliary equipment. The modular LRU may be quickly replaced with another similarly or differently equipped LRU during service or maintenance of the mobile communicator 106.

The components of the mobile communicator 106 may include one or more controllers, antennas, analyzers, sensors, positioning modules, and memory components for facilitating communication with the satellite stations 102, 104. A controller 116 is housed within an LRU 126 affixed to the mobile platform 108. An antenna 118, an analyzer 120 and/or sensor, a positioning module 156 (e.g., global positioning unit (GPS)), and an external memory device 154 (housed within LRU 159) are coupled to the controller 116 via an input/output (I/O) circuit 122 and a respective conduit 158. Although the I/O circuit 122 is shown in FIG. 1 as a single block, it may include a variety of types of I/O circuits. The antenna 118, analyzer 120 and/or sensor, and/or portions thereof, may be housed within a radome 124 extending from the mobile platform 108, wherein the antenna 118 may be positioned by the controller 116 for interaction with the satellite stations.

The controller 116 may include one or more computing devices or processors 128 (e.g., microcontroller, microprocessor), a program memory 130, a pair of communication modems 132, 134, a random-access memory (RAM) 136, and a communication router module 138; all of which may be interconnected via an address/data bus 140. It is to be understood that the controller 116 may include multiple program memories and RAMs, and that these program memories and RAMs may be implemented as semiconductor memories, magnetically readable memories, and/or optically readable memories, for example.

The program memory 130 and/or the RAM 136 may include a plurality of software applications 142, a plurality of software routines 144, and a graphical user interface (GUI) module 146. The software applications 142 and/or routines 144 may include instructions and steps that when executed by the processor 128, such as a controller processor unit (ACPU) for an air-to-ground communication system, for example, cause the mobile communicator 106 to facilitate and support bi-directional end-user device 150 call/data/communication pathways from ground communication networks to/from the end-user mobile devices 150. That is, the processor 128 is communicably coupled via a conduit 160 to the LAN/WLAN 148 and configured to enable the mobile communication device 150 of an end user, e.g., passenger aboard the mobile platform 108, to communicate with the network 110 via one or both communication links 112, 114 to the one or more satellite stations 102, 104. In particular, the processor 128 and communication router module 138 may cooperate to coordinate call traffic routing and subscriber management, including a conversion between digital modem traffic from the antenna 118 and Wi-Fi traffic from the end-user mobile device(s) 150 operatively coupled to the LAN/WLAN 148. End-user specific information that may be used by the processor 128 and/or communication router module 138 while coordinating call traffic, etc., may include account information, billing information, and media content, any of which may be stored in one or more of the memory devices able to be accessed by the processor 128.

The software applications 142 and/or routines 144 also include instructions and steps that when executed by the processor 128 cause the mobile communicator 106 to determine which modem 132, 134 to use when communicating with the one or more satellite stations. For example, the software applications 143 or routines 144 may include a communicator controller application or routine having a set of instructions that when executed by the processor 128 cause the controller 116 to carry out various applications and functions associated with the handoff of communication with the network 110 from the first communication link 112 to the second communication link 114. In particular, execution of the communicator controller application by the processor 128 may initiate, coordinate, execute, or instruct one or more steps for calculating the identity of the second satellite station 104 and selecting which modem 132, 134 and communication link 112, 114 to use for communicating with the network 110.

Each modem 132, 134 facilitates the conversion of radio frequency (RF) signals to/from digital signals. The system 100 may use any of a number of frequency bands to send and receive wireless communication with the one or more satellite stations 102, 104 over the communication link(s) 112, 114. The wireless communication to and from the satellite stations may be modulated onto waves with frequencies in one of several known satellite communication frequency bands. For example, the carrier wave frequencies may be in the $K_u$ band between 12-18 GHZ, the $K_a$ band between 26.5-40 GHz, and/or the L band 1-2 GHz. Additionally, other frequency bands within and outside of the microwave spectrum may be used.

The first modem 132 of the pair of modems is communicably coupled to the processor 128 and facilitates the first communication link 112 between the controller 116, the antenna 118, and the first satellite station 102. As the mobile platform 108 travels, it is expected that the mobile quality of service (QoS) associated with the first communication link 112 may eventually deteriorate due to the increasing distance between the first satellite station 102 and the travelling mobile platform 108. In anticipation of the declining communication quality between the first satellite station 102 and the first modem 132, the controller 116 utilizes one or more maps 152 of satellite stations to determine the second satellite station 104 for establishing the second communication link 114 via the second modem 134 before the communication quality of the first communication link 112 degrades to an unsatisfactory level. The maps 152 of satellite stations capable of being used for communication with the mobile communicator 106 may be stored on the memory device, e.g., RAM 136, of the mobile communicator 106. The satellite maps 152 may also be stored on the external memory device 154 operatively coupled to the controller 116 and/or transmitted to the controller 116 in response to a satellite station map request sent from the controller 116.

Because the route and travelling characteristics of the mobile platform 108 are known or are capable of being readily determined, e.g., location, velocity, direction; and the locations or travel paths of the satellite stations 102, 104 are known or can be attained through the one or more satellite network maps 152, it is possible for the controller 116 to determine, calculate, forecast, and/or predict the identity of the second satellite station 104 from among several prospective satellite stations that is acceptable for communication with the mobile platform 108. The determination of the second satellite station 104 may be based in part on one or more considerations or combinations thereof, such as: the type of satellite station, the location of the satellite station, the distance of the satellite station from the mobile platform 108, and the amount and particularity of time the satellite station is expected to be within an acceptable communication range of the mobile platform 108, for example. The mobile communicator may use travelling characteristics of the mobile platform 108 and the prospective satellite stations of the satellite network maps 152 to predict which satellite station is suitable for receiving the communication handoff from the mobile communicator 106. Upon identifying the second satellite station 104, the controller 116 timely readies the second communication link 114 via the second modem 134 to the second satellite station 104. At an appropriate time after the identity of second satellite station has been calculated, which may range from a few seconds to hundreds of minutes, the controller 116 will initiate, coordinate, execute, or instruct the handoff or handover of communication from the first satellite station 102 to the second satellite station 104. More particularly, the controller 116 hands off communication from the first communication link 112 and the first modem 132 to the second communication link 114 and the second modem 134.

To ensure communication quality between the mobile platform 108 and the satellite stations, the processor 128 of the controller 116 may monitor one or more communication indicators associated with one or both of the communication links 112, 114 to determine or calculate whether communication conducted over the first communication link 112 should be handed off to the second communication link 114 before the expected deterioration of the first communication link 112. Each communication indicator may be derived from or based on geographic data and/or signal data associated with the first and/or second communication link 112, 114. One or more communication indicators and combinations thereof may be monitored, received (e.g., sensor), and/or analyzed by the processor 128 and/or analyzer 120 of the controller 116 to determine or calculate whether and when it may be advantageous to handoff communication from the first communication link 112 and the first modem 132 to the second communication link 114 and the second modem 134.

One type of communication indicator is a geographic-based communication indicator, which generally relates to geographically based aspects, characteristics, and/or parameters of the communication associated with the first and/or second communication links 112, 114, such as, current and projected location of the first and/or second satellite stations 102, 104, e.g., latitude, longitude, and altitude. The processor 128 and/or analyzer 120 of the controller 116 may analyze or evaluate the geographic communication indicator by comparing respective data characteristics associated with the first and second communication links 112, 114. For example, the current and predicted locations of the first and second satellite stations 102, 104 can be used to determine the respective distance of each satellite station from the mobile platform 108 at various times. If at a particular time the distance from the mobile platform 108 and/or the mobile communicator 106 to the first satellite station 102 is more than the distance from the mobile platform 108 and/or mobile communicator 106 to the second satellite station 104, it may be presumed at that time, that because of the shorter distance to the second satellite station 104, the second communication link 114 with the second modem 134 may be better suited for facilitating communication between the one or more end users aboard the mobile platform 108 and the network 110 than the first communication link 112 with the first modem 132. The processor 128 of the controller 116 may then prepare for handing off communication with the mobile communicator 106 from the first satellite station 102 to the second satellite station 104. In particular, the processor 128 of the controller 116 may initiate, coordinate, execute, or instruct the timely handoff of communication from the first communication link 112 and the first modem 132 to the second communication link 114 and the second modem 134.

Alternatively, the processor 128 of the controller 116 may evaluate geographic data characteristics associated with the first and/or second communication links 112, 114 with respect to a threshold level of a respective parameter. For example, the controller 116 and/or analyzer 120 may compare the distance between the mobile platform 108 and/or mobile communicator 106 and the first and/or second satellite station 102, 104 to a distance threshold level. The distance threshold level, which may be stored on any of the memory devices capable of being accessed by the processor 128, may be determined by historical data related to mobile communication quality involving a type of modem that includes or is similar to the first 132 and/or second 134 modem and a type of satellite station that includes or is similar to the first 102 and/or second 104 satellite station. If the distance from the mobile platform 108 and/or mobile communicator 106 to the second satellite station 104 is less than the distance threshold level, it may be presumed that the second satellite station 104 is within an acceptable or satisfactory communication range of the mobile platform 112 and the processor 128 of the controller 114 may determine to initiate, coordinate, execute, or instruct the handoff of communication from the first communication link 112 and the first modem 132 to the second communication link 114 and the second modem 134. Additionally, if the distance from the mobile platform 108 and/or mobile communicator 106 to the second satellite station 104 is greater than the distance threshold level, it may be presumed that the second satellite station 104 is outside of an acceptable or satisfactory communication range of the mobile platform 112. The processor 128 of the controller 114 may then calculate or predict a time when the mobile platform 108 and/or mobile communicator 106 will be within an acceptable or satisfactory communication range of the second satellite and accordingly prepare for initiating, coordinating, executing, or instructing the timely handoff of communication from the first communication link 112 and the first modem 132 to the second communication link 114 and the second modem 134.

Another type of communication indicator that may be monitored, received, and/or analyzed by the processor 128 and/or analyzer 120 of the controller 116 to determine when it may be advantageous to handoff communication from the first communication link 112 is a signal-based communication indicator. The signal-based communicator indicator generally relates to aspects or characteristics of the communication signal over the communication link, and may include information relating to signal data associated with the first 102 and/or second 104 satellite station and/or communication with one or both of the communication links 112, 114 and/or modems 132, 134. Some examples of a signal characteristic or aspect that may be used as a signal-based communication indicator include: signal quality or quality of the communication signal at either modem, signal power or power of the communication signal received at either modem, signal noise (signal-to-noise ratio; (SNR)) associated with either modem; signal strength or strength of the communication signal (decibel-to-milliwatt; dBm, dBmW) received at either modem; comparative or relative signal strength received between the first modem and the second modem; or if one or more of the signal characteristics is closer to one or more desired signal parameters (distortion, attenuation, interference). The signal analyzer 120 or sensor operatively coupled to the controller 116 may receive the one or more signal-based communication indicators, wherein the processor 128 and/or analyzer 120 of the controller 116 may analyze the received signal-based communication indicator(s) by comparing respective data characteristics associated with the first and second communication links 112, 114. For example, observation and/or analysis of the communication signal indicator may be useful in determining when the mobile communicator 106 is outside an acceptable communication range of the first satellite station 102 and/or within an acceptable communication range of the second satellite station 104.

Communication over a particular communication link 112, 114 may be deemed better by having or expecting higher and/or lower levels of one or more signal characteristics or features. For example, signal data associated with the use of the first communication link 112 may be compared to signal data associated with the use of the second communication link 114 to determine which communication link has a better signal. If the first communication link 112 is deemed to have a better signal(s) than the second communication link 114, the controller 116 may determine to continue using the first communication link 112 and not initiate, coordinate, execute, or instruct a handoff of communication from the first communication link 112 to the second communication link 114 until a later time. Sometime later, the controller 116 and/or analyzer 120 may analyze the communication indicator(s) present at that time, or forecasted to be at a later time, to determine if and/or when it is advantageous to handoff the communication from the first communication link 112 to the second communication link 114. If at that later time, the second communication link 114 is determined to have a better signal(s) than the first communication link 120, the processor 128 of the controller 114 may prepare, initiate, coordinate, execute, or instruct the handoff of communication from the first communication link 120 and the first modem 132 to the second communication link 114 and the second modem 134.

Additionally, the processor 128 and/or analyzer 120 of the controller 116 may analyze one or more signal-based communication data characteristics associated with the first and/or second communication links 112, 114 to a threshold level for the respective communication data characteristic(s). For instance, the controller 116 may compare or evaluate one or more respective signal data characteristics associated with the first and/or second communication link 112, 114 to a signal data threshold level of a respective signal-based parameter. The value of the signal data threshold level, which may be stored on any of the memory devices capable of being accessed by the processor 128, may include a predetermined parameter associated with an acceptable signal data level on the communication link. For example, if a signal power associated with the second communication link 114 is greater than a signal power threshold level, the controller 116 and/or analyzer may determine to initiate, coordinate, execute, or instruct the handoff of communication from the first modem 132 and first communication link 112 to the second modem 134 and second communication link 114. Additionally, if the signal power associated with the second communication link 114 is expected to be greater than a signal power threshold level at some later time, the controller 116 and/or analyzer 120 may prepare the first 132 and second 134 modems and the first 112 and second 114 communication links for handing off communication from the first satellite station 102 to the second satellite station 104.

The handoff of the communication prepared, initiated, coordinated, executed, or instructed by the processor 128 of the controller 116 may be a hard handoff or a soft handoff. In a hard handoff, the established communication link 112 between the first satellite 102 and the communicator controller 116 is released by the processor 128 of the controller 116 before the second communication link 114 is engaged or established. In a soft handoff, the established first communication link 112 is retained and may be used by the processor 128 of the controller 116 in parallel with the subsequently established second communication link 114 before the first communication link 112 is released.

There are advantages and disadvantages to hard and soft handoffs and the decision to utilize one type of handoff over the other depends on the preference of the system designer and/or user of the mobile communicator 106. For example, the hard handoff generally utilizes less hardware because there is no need to maintain two communication links in parallel. However, if the execution of the hard handoff fails, the communication link between the end user(s) and the network 110 may be disrupted or terminated. One advantage of the soft handoff is that failed communication handoffs are generally fewer because the first communication link is released only after a reliable connection with the second communication link is established. On the other hand, the hardware necessary for processing multiple communication links in parallel during a soft handoff is often more costly and complex than the hardware required for a hard handoff.

In mobile communicators using only a single antenna 118 to facilitate communication on one or the other of the communication links 112, 114, the signal-based indicator(s), e.g., characteristic(s), associated with the communication link that is not coupled to the antenna 118 may be compensated and then analyzed and/or compared to the respective signal-based indicator(s) of the other communication link coupled to the antenna, or the signal data threshold level(s). Communication handoffs performed by mobile communicators 106 with single antenna configurations may also include decoupling, coupling, and positioning of the lone antenna. More specifically, the processor 128 of the controller 116 and/or another processor of perhaps another controller may decouple the antenna 118 from the first modem 132 and operatively couple the antenna 118 to the second modem 134. The processor 128 and/or another processor may then position and reposition the antenna 118 toward the second satellite station 104 and track the second satellite station 104 to maintain and/or improve communication with the controller 116. In an alternative embodiment of the mobile communicator 106 implementing two antennas, the first antenna may be primarily coupled to the first modem 132 and a second antenna may be primarily coupled to the second modem 134, wherein the processor(s) of the controller(s) may position and reposition either antenna toward a desired direction, e.g., satellite station.

Figure 2:
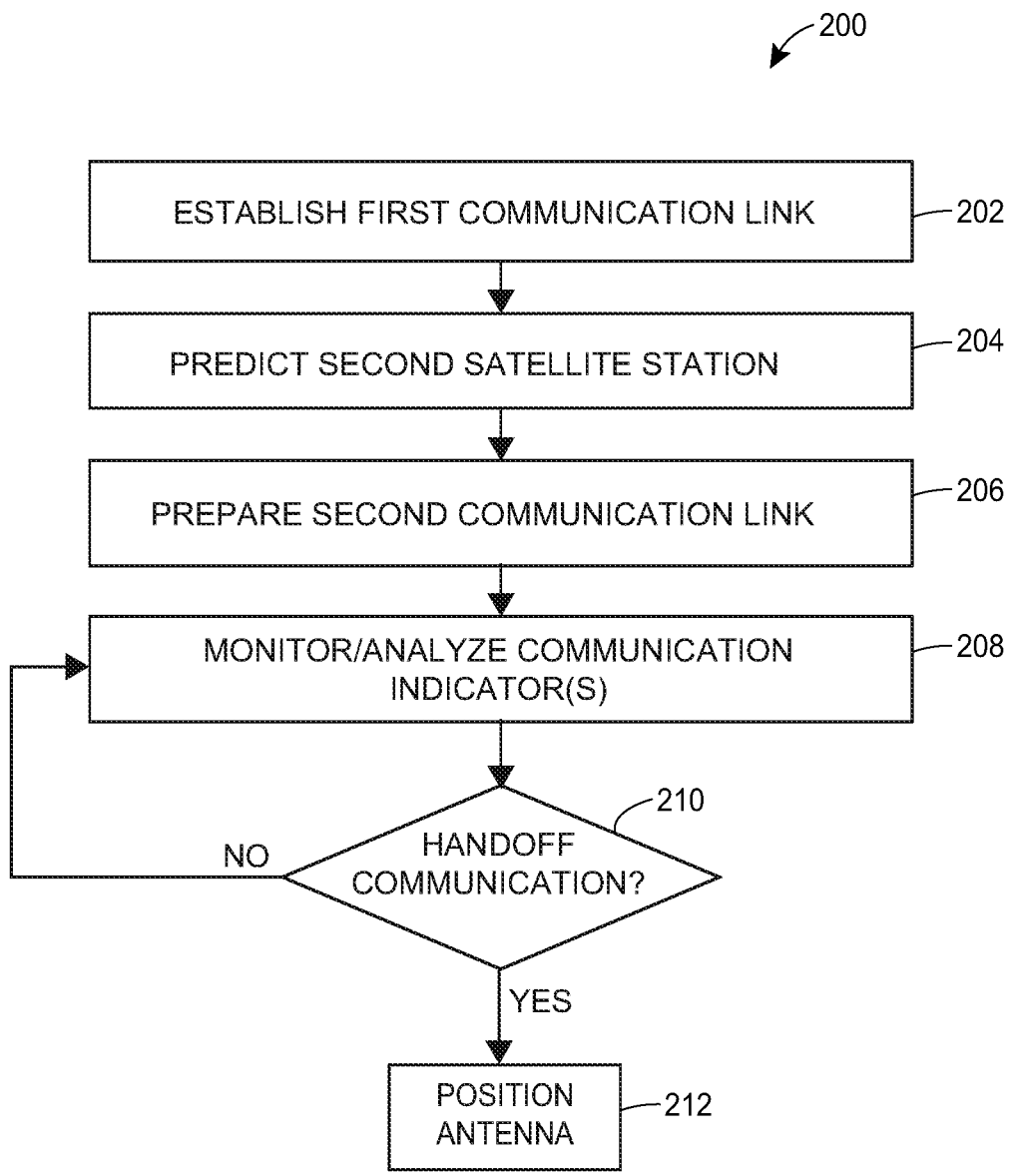
FIG. 2 illustrates a flow diagram of an example method for communicating with one or more networks of satellite stations in accordance with the embodiments described herein.

A flow diagram 200 depicting an example method capable of being executed by the multi-modem mobile communicator 108 of the present invention illustrated in FIG. 1 is shown in FIG. 2. The first communication link 112 including an antenna 118 is established via the first modem 132 between the first satellite station 102 and the controller 116 (block 202). The first communication link 112 may extend to the LAN/WLAN 148 and one or more mobile communication devices 150 of one or more end users aboard the mobile platform 108. Communication between the first satellite station 102 and the first modem 132 is conducted over a first frequency. The first frequency may include any range of a frequency band, including, and not limited to: $K_a$-band, $K_u$-band, and L-band.

The mobile communicator 106 may periodically verify its geographical location by checking geographic data and/or communication signal data. The processor 128 of the controller 116 may utilize one or more maps 152 of one or more networks of satellite stations to calculate and forecast the identity of the second satellite station 104 (block 204). The one or more maps 152 of satellite networks may be transmitted to the communicator controller 116 and/or stored in the memory device 136, 154 coupled to the communicator controller 116. The memory device 136, 154 may include one or more hard disk drives, optical storage drives, solid state storage devices, and a like.

Upon identification or determination of the prospective second satellite station 104, the processor 128 of the controller 106 prepares the mobile communicator 106 for the expected communication handoff from the first satellite station 102 to the second satellite station 104 (block 206). Preparation for the communication handoff may include the processor 128 of the controller 106 establishing the second communication link 114 via the second modem 118 to the second satellite station 104. Communication between the second satellite station 104 and the second modem 118 is to be conducted over a second frequency. Similar to the first frequency, the second frequency may include any range of a frequency band, including, and not limited to: $K_a$-band, $K_u$-band, and L-band. The first and second frequencies may be the same or different.

Around the time of the predicted communication handoff from the first communication link 102 to the second communication link 104, the controller 106 may initiate, coordinate, execute, or instruct the communication handoff. The controller 114 may also monitor the first communication link 112 by receiving one or more communication indicators. In one instance, the communication indicator(s) is received via the analyzer 120 or sensor. The processor 128 and/or analyzer 120 of the controller 116 may analyze the received communication indicator(s) (block 208) as discussed above to determine whether and when it may be advantageous to handoff communication from the first communication link 112 and the first modem 132 to the second communication link 114 and the second modem 134 (block 210). If the communication handoff is not to occur at that time, the controller 116 and/or analyzer 120 may continue to monitor and analyze the communication indicator(s). When the communication from the first communication link 112 and the first modem 132 is to be handed off to the second communication link 114 and the second modem 134, the mobile communicator 106 may initiate, coordinate, execute, or instruct the communication handoff.

In systems utilizing a single antenna, the controller 116 and/or another controller, e.g., an antenna controller, may uncouple the lone antenna 118 from the first modem 132 and couple the antenna 118 to the second modem 134 based on the communication handoff. That is, the antenna 118 may be uncoupled, coupled, and/or positioned prior to, during, and/or after the time when communication is handed off between the communication links. The controller 116 and/or antenna controller may also reposition the antenna 118 for better communication with the second satellite station 114 by moving the antenna 118 away from the first satellite station 102 and directing the antenna 118 toward the second satellite station 104 (block 212).

Figure 3:
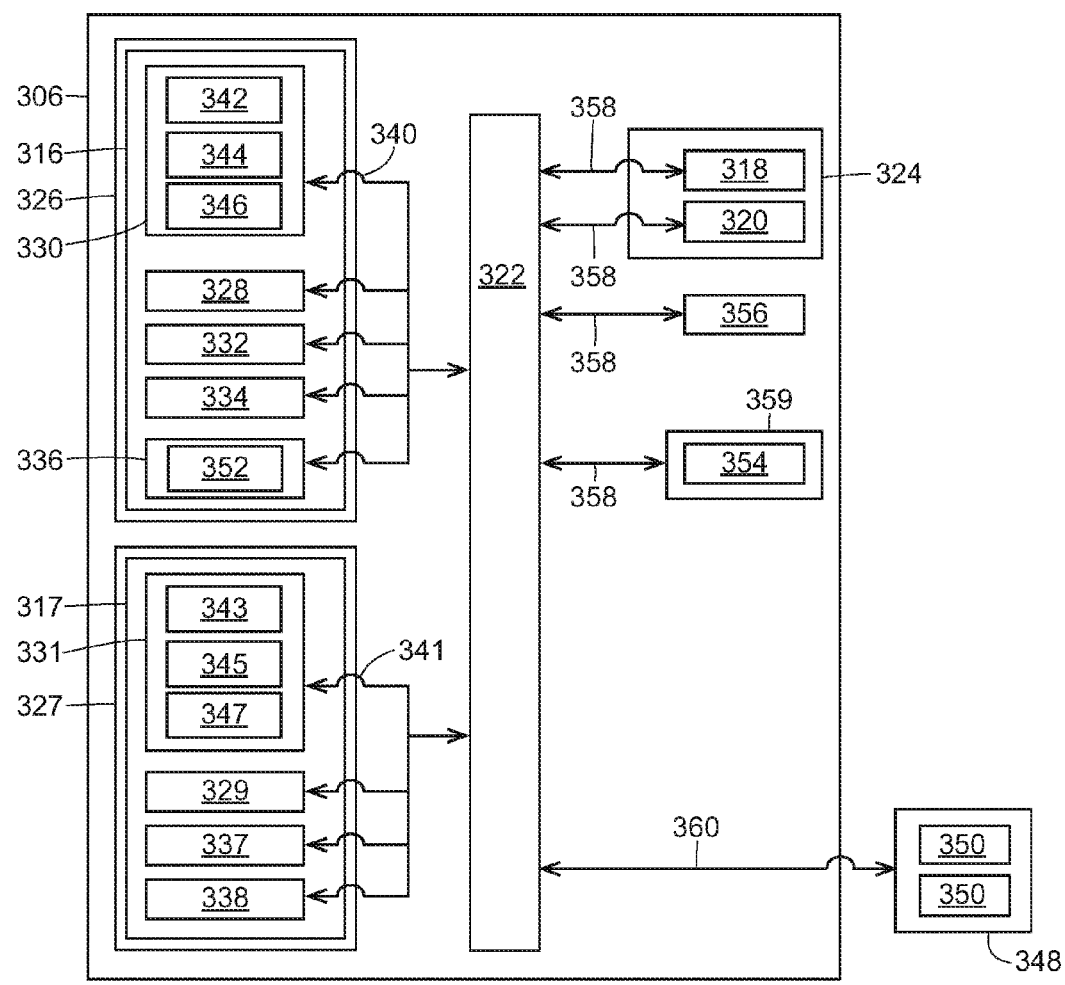
FIG. 3 depicts a block diagram of an example mobile communicator capable of communicating with a plurality of satellite stations from one or more networks of satellite stations in accordance with the embodiments described herein.

Another example embodiment of the mobile communicator, or an aspect thereof, capable of executing the method illustrated in FIG. 2 is depicted in FIG. 3. The mobile communicator 306 is similar to the mobile communicator 106 shown in FIG. 1 in many regards; however the mobile communicator 306 of FIG. 3 includes a pair of controllers for performing the several tasks of the mobile communicator 306 as opposed to the single controller 106 implemented in the mobile communicator 106 of FIG. 1.

The mobile communicator 306 of FIG. 3 is mounted to the mobile platform 108 of FIG. 1 and substantially enclosed therein. The mobile communicator 306 includes several components that may be housed within one or more LRUs 326, 327 affixed within the mobile platform 108. The mobile communicator 306 includes a first controller 316 and a second controller 317 and each controller 316, 317 is separately housed in a respective LRU 326, 327. Additional components of the mobile communicator 306 include one or more antennas, analyzers, positioning modules, and memory components for facilitating communication with the network 110 via the satellite stations 102, 104 shown in FIG. 1. For example, the mobile communicator 306 may include an antenna 318, an analyzer 320 or sensor, a positioning module (e.g., global positioning unit (GPS)) 356, and an external memory component 354 (housed within LRU 359); all of which are operatively coupled to the first and second controllers 316, 317 via an input/output (I/O) circuit 322 and a respective conduit 358. Although the I/O circuit 322 is shown in FIG. 3 as a single block, it may include a variety of types of I/O circuits. The antenna 318 and/or analyzer 320, and/or portions thereof, may be housed within a radome 324 extending from the mobile platform 108, wherein the antenna 318 may be positioned by the second controller 317 for interaction with the satellite stations.

The first and second controllers 316, 317 may be adapted and configured for different functions within the mobile communicator 306. For example, the first controller 316 may be primarily adapted and configured to predict, prepare, initiate, coordinate, execute, and/or instruct a handoff of communication from the first communication link 112 with the first satellite station 102 to the second communication link 114 with the second satellite station 104. The second controller 317 may be primarily configured to facilitate and support bi-directional communication between the communication network 110 (e.g., ground communication networks) and end-user mobile communication devices 350 (e.g., mobile phone, personal computer (laptop/desktop/tablet), wearable computing and/or communicating devices) operatively coupled to the LAN/WLAN 348 via a conduit 360.

The first controller 316 includes a first computing device or first processor 328, (which may be a microcontroller or a microprocessor), a program memory 330, a first modem 332, a second modem 334, and a random-access memory (RAM) 336, all of which may be interconnected via a first address/data bus 340.

The program memory 330 and/or the RAM 336 may include a plurality of software applications 342, a plurality of software routines 344, and a graphical user interface (GUI) 346. The software applications 342 and/or routines 344 may include instructions and steps that when executed by the first processor 328 cause the mobile communicator 306 to carry out the functions associated with the handoff of communication from the first communication link 112 to the second communication link 114 as described herein. For example, the first processor 328 may determine the location of one or more satellite stations (e.g., the second satellite station 102); analyze one or more communication indicators; and prepare, initiate, coordinate, execute, or instruct a communication handoff between the first and second communication links 112, 114.

Each modem 332, 334 facilitates the conversion of radio frequency (RF) signals to/from digital signals. The system may use any of a number of frequency bands to send and receive wireless communication with the one or more satellite stations 102, 104 over the communication link(s) 112, 114. The wireless communication to and from the satellite stations may be modulated onto waves with frequencies in one of several known satellite communication frequency bands.

The first modem 332 of the pair of modems is communicably coupled to the first processor 328 and facilitates the first communication link 112 between the controller 316, the antenna 318, and the first satellite station 102. In anticipation of the declining communication quality between the first satellite station 102 and the first modem 332, the controller 316 utilizes one or more maps 352 of satellite stations to determine the second satellite station 104 for establishing the second communication link 114 via the second modem 334 before the communication quality of the first communication link 112 degrades to an unsatisfactory level. The maps 352 of satellite stations that are candidates for being used for communication with the mobile communicator 306 may be stored on the memory device, e.g., RAM 336, of the mobile communicator 306. The satellite maps 352 may also be stored on an external memory device 354 operatively coupled to the controller 316 and/or transmitted to the controller 316 in response to a satellite station map request sent from the controller 316.

Because the route and travelling characteristics of the mobile platform 108 are known or are capable of being readily determined, e.g., location, velocity, direction; and the locations or travel paths of the satellite stations 102, 104 are known or can be attained through the one or more satellite network maps 352, it is possible for the controller 316 to calculate, predict, and identify the second satellite station 104 from among several prospective satellite stations that may be acceptable for communication with the mobile platform 108. The determination of the second satellite station 104 may be based in part on one or more considerations or factors, and combinations thereof, such as: the type of satellite station, the location of the satellite station, the distance of the satellite station from the mobile platform 108, and the amount of time the satellite station is expected to be within an acceptable communication range of the mobile platform 108, for example. Upon identifying the time and location of a particular satellite station that is suitable for receiving the communication handoff from the first satellite station, the controller 316 will prepare the second communication link 114 and the second modem 334 for the timely communication handoff from the first satellite station to the second satellite station when the second satellite station is within an acceptable communication range of the mobile platform 106.

To ensure communication quality for the one or more end users aboard the mobile platform 108, the first processor 328 of the controller 316 may also monitor one or more communication indicators associated with one or both of the communication links 112, 114 to determine whether communication conducted over the first communication link 112 should be handed off or handed over to the second communication link 114 before the expected deterioration of the first communication link 112. One or more communication indicators and combinations thereof may be received at the analyzer 320 and analyzed by the first processor 328 of the controller 316 to determine whether and when it may be advantageous to handoff communication from the first communication link 112 and the first modem 332 to the second communication link 114 and the second modem 334. For example, signal data associated with the use of the first communication link 112 may be compared to signal data associated with the use of the second communication link 114 to determine which communication link has a better signal. If the second communication link 114 is deemed to have a better signal(s) than the second communication link 112, the controller 316 may determine to initiate, coordinate, execute, or instruct a handoff of communication from the first communication link 112 to the second communication link 114.

Additionally, the first processor 328 of the controller 316 may analyze one or more signal-based communication data characteristics associated with the first and/or second communication links 112, 114 to a threshold level for the respective communication data characteristic(s). For instance, the controller 316 may compare one or more respective signal data characteristics associated with the first and/or second communication link 112, 114 to a signal data threshold level of a respective signal-based parameter. The value of the signal data threshold level may include a predetermined parameter associated with an acceptable signal data level on the communication link. For example, if a signal power associated with the second communication link 114 is greater than a signal power threshold level, the controller 316 may determine to initiate, coordinate, execute, or instruct the handoff of communication from the first modem 332 and first communication link 112 to the second modem 334 and second communication link 114.

The second controller 317 includes a second computing device or processor 329 such as a controller processor unit (ACPU) for an air-to-ground communication system, a program memory 331, a random-access memory (RAM) 337, and a router module 338; all of which may be interconnected via a second address/data bus 341 and coupled to the I/O circuit 322.

The second processor 329, which may be a microcontroller or a microprocessor, may also be communicably coupled via a conduit 360 to the LAN/WLAN 348 and configured to enable the mobile communication devices 350 of the end users to access with the network 110 via one or more communication links 112, 114 to the one or more satellite stations 102, 104. The program memory 331 and/or the RAM 337 may include a plurality of software applications 343, a plurality of software routines 345, and a graphical user interface (GUI) 347. The software applications 343 and/or routines 342 may include instructions and steps that when executed by the second processor 329 cause the second controller 317 to coordinate call traffic routing and subscriber management, including a conversion between digital modem traffic from the antenna 318 to Wi-Fi of the end-user mobile devices 350 operatively coupled to the LAN/WLAN 348.

In mobile communicators 306 using only a single antenna 318 to facilitate communication on one or the other of the communication links 112, 114, the handoff of communication from the first communication link 112 to the second communication link 114 may be accompanied by decoupling, coupling, and positioning of the antenna 318. In such instances, the second processor 329 of the second controller 317 may operatively decouple the antenna 318 from the first modem 332 and operatively couple the antenna 318 to the second modem 334. The second processor 329 may then position the antenna 318 toward the second satellite station 104 to improve communication with the mobile communicator 306. In an alternative embodiment wherein the mobile communicator 306 includes two antennas, the first antenna may be primarily coupled to the first modem 332 and a second antenna may be primarily coupled to the second modem 334, wherein the second processor 329 of the second controller 317 may position either antenna toward a desired direction, e.g., satellite station.

Figure 4:
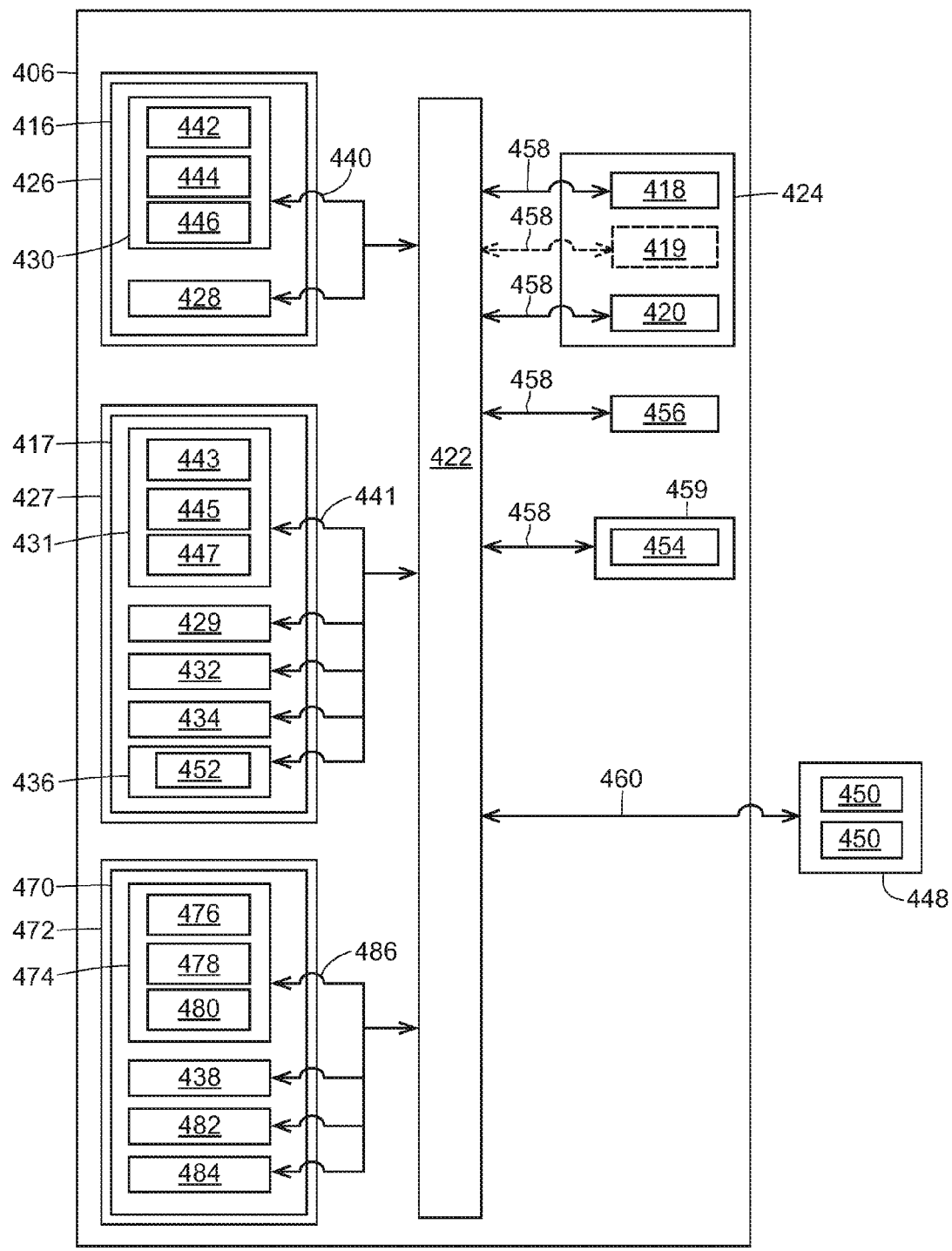
FIG. 4 depicts a block diagram of another example mobile communicator capable of communicating with a plurality of satellite stations from one or more networks of satellite stations in accordance with the embodiments described herein.

Another example embodiment of the mobile communicator, or an aspect thereof, capable of executing the method illustrated in FIG. 2 is depicted in FIG. 4. The mobile communicator 406 is similar to the mobile communicator shown in FIGS. 1 and 3 in many regards, however the mobile communicator 406 of FIG. 4 includes three controllers for performing the several tasks of the mobile communicator 406 as opposed to the single or dual controller configurations depicted in FIGS. 1 and 3, respectively.

The mobile communicator 406 of FIG. 4 is mounted to the mobile platform 108 of FIG. 1 and substantially enclosed therein. The mobile communicator 406 includes several components that may be housed within one or more LRUs 426, 427, 472 affixed within the mobile platform 108. The mobile communicator 406 includes a first controller 416, a second controller 417, and a third controller 470, wherein each controller 416, 417, 470 is separately housed in a respective LRU 326, 327, 472. Additional components of the mobile communicator 306 include one or more antennas, analyzers, positioning modules, and memory components for facilitating communication with the network 110 via the satellite stations 102, 104 shown in FIG. 1. For example, the mobile communicator 406 may include an antenna 418, a second antenna 419, an analyzer 420 or sensor, a positioning module (e.g., global positioning unit (GPS)) 456, and an external memory component 454 (housed within LRU 459); all of which are operatively coupled to the first, second, and third controllers 416, 417, 470 via an input/output (I/O) circuit 422 and a respective conduit 458. Although the I/O circuit 422 is shown in FIG. 4 as a single block, it may include a variety of types of I/O circuits. The antennas 418, 419 and/or analyzer 320, and/or portions thereof, may be housed within a radome 424 extending from the mobile platform 108, wherein the antennas 418, 419 may be positioned by the mobile communicator 406 for interaction with the satellite stations.

The first, second, and third controllers 416, 417, 470 may be adapted and configured for different functions within the mobile communicator 406. For example, the first controller 416 may be primarily configured to position one or more antennas for communication with the satellite stations and/or other communication networks. The second controller 417 may be primarily adapted and configured to predict, prepare, initiate, coordinate, execute, and/or instruct a handoff of communication from the first communication link 112 with the first satellite station 102 to the second communication link 114 with the second satellite station 104. The third controller 470 may be primarily configured to facilitate and support bi-directional communication between the communication network 110 (e.g., ground communication networks) and end-user mobile communication devices 450 (e.g., mobile phone, personal computer (laptop/desktop/tablet), wearable computing and/or communicating devices) operatively coupled to the LAN/WLAN 448 or other network via a conduit 460.

In mobile communicators 406 using a single antenna 418 to facilitate communication on one or the other of the communication links 112, 114, the handoff of communication from the first communication link 112 to the second communication link 114 may be accompanied by decoupling, coupling, and positioning of the antenna 418. In such instances, the first processor 428 of the first controller 416 may operatively decouple the antenna 418 from the first modem 432 and operatively couple the antenna 418 to the second modem 434. The first processor 428 may then position the antenna 418 toward the second satellite station 104 to improve communication with the mobile communicator 406. In an alternative embodiment wherein the mobile communicator 406 includes multiple antennas, a first antenna 418 may be primarily coupled to the first modem 432 and a second antenna 419 may be primarily coupled to the second modem 434, wherein the first processor 428 of the first controller 416 may position either antenna 418, 419 toward a desired direction, e.g., satellite station.

The second controller 417 includes a second computing device or second processor 429, (which may be a microcontroller or a microprocessor), a program memory 431, a first modem 432, a second modem 434, and a random-access memory (RAM) 436, all of which may be interconnected via a first address/data bus 440.

The program memory 431 and/or the RAM 436 may include a plurality of software applications 443, a plurality of software routines 445, and a graphical user interface (GUI) 447. The software applications 443 and/or routines 445 may include instructions and steps that when executed by the second processor 429 cause the mobile communicator 406 to carry out the functions associated with the handoff of communication from the first communication link 112 to the second communication link 114 as described herein. For example, the second processor 429 may calculate the location of one or more prospective satellite stations (e.g., the second satellite station 102); analyze one or more communication indicators; and prepare, initiate, coordinate, execute, or instruct a communication handoff between the first and second communication links 112, 114.

Each modem 432, 434 facilitates the conversion of radio frequency (RF) signals to/from digital signals. The system may use any of a number of frequency bands to send and receive wireless communication with the one or more satellite stations 102, 104 over the communication link(s) 112, 114. The wireless communication to and from the satellite stations may be modulated onto waves with frequencies in one of several known satellite communication frequency bands.

The first modem 432 of the pair of modems is communicably coupled to the second processor 429 and facilitates the first communication link 112 between the mobile communicator 406, the antenna 418, and the first satellite station 102. In anticipation of the declining communication quality between the first satellite station 102 and the first modem 432, the second controller 417 utilizes one or more maps 452 of satellite stations to determine the second satellite station 104 for establishing the second communication link 114 via the second modem 434 before the communication quality of the first communication link 112 degrades to an unsatisfactory level. The maps 452 of satellite stations that are candidates for being used for communication with the mobile communicator 406 may be stored on the memory device, e.g., RAM 436, of the mobile communicator 406. The satellite maps 452 may also be stored on an external memory device 454 and operatively coupled to the second controller 417 and/or transmitted to the second controller 417 in response to a satellite station map request sent from the mobile communicator 406.

Because the route and travelling characteristics of the mobile platform 108 are known or are capable of being readily determined, e.g., location, velocity, direction; and the locations or travel paths of the satellite stations 102, 104 are known or can be attained through the one or more satellite network maps 452, it is possible for the second controller 417 to calculate, predict, and identify the second satellite station 104 from among several prospective satellite stations that may be acceptable for communication with the mobile platform 108. The determination of the second satellite station 104 may be based in part on one or more considerations or factors, and combinations thereof, such as: the type of satellite station, the location of the satellite station, the distance of the satellite station from the mobile platform 108, and the amount of time the satellite station is expected to be within an acceptable communication range of the mobile platform 108, for example. Upon identifying the time and location of a particular satellite station that is suitable for receiving the communication handoff from the first satellite station, the controller 417 will prepare the second communication link 114 and the second modem 434 for the timely communication handoff from the first satellite station to the second satellite station when the second satellite station is within an acceptable communication range of the mobile platform 106.

To ensure communication quality for the one or more end users aboard the mobile platform 108, the second processor 429 of the second controller 417 may also monitor one or more communication indicators associated with one or both of the communication links 112, 114 to determine whether communication conducted over the first communication link 112 should be handed off or handed over to the second communication link 114 before the expected deterioration of the first communication link 112. One or more communication indicators and combinations thereof may be received at the analyzer 420 and analyzed by the second processor 429 and/or analyzer 420 of the second controller 417 to determine whether and when it may be advantageous to handoff communication from the first communication link 112 and the first modem 432 to the second communication link 114 and the second modem 434. For example, signal data associated with the use of the first communication link 112 may be compared to signal data associated with the use of the second communication link 114 to determine which communication link has a better signal. If the second communication link 114 is deemed to have a better signal(s) than the second communication link 112, the second controller 417 may determine to initiate, coordinate, execute, or instruct a handoff of communication from the first communication link 112 to the second communication link 114.

Additionally, the second processor 429 of the second controller 417 may analyze one or more signal-based communication data characteristics associated with the first and/or second communication links 112, 114 to a threshold level for the respective communication data characteristic(s). For instance, the second controller 417 may compare one or more respective signal data characteristics associated with the first and/or second communication link 112, 114 to a signal data threshold level of a respective signal-based parameter. The value of the signal data threshold level may include a predetermined parameter associated with an acceptable signal data level on the communication link. For example, if a signal power associated with the second communication link 114 is greater than a signal power threshold level, the second controller 417 may determine to prepare, initiate, coordinate, execute, or instruct the handoff of communication from the first modem 432 and first communication link 112 to the second modem 434 and second communication link 114.

The third controller 470 includes a third computing device or processor 438 such as a controller processor unit (ACPU) for an air-to-ground communication system, a program memory 474, a random-access memory (RAM) 482, and a router module 484; all of which may be interconnected via a second address/data bus 486 and coupled to the I/O circuit 422.

The third processor 438, which may be a microcontroller or a microprocessor, may also be communicably coupled via a conduit 460 to the LAN/WLAN 448 or other network and configured to enable the mobile communication devices 450 of the end users to access with the network 110 via one or more communication links 112, 114 to the one or more satellite stations 102, 104. The program memory 474 and/or the RAM 482 may include a plurality of software applications 476, a plurality of software routines 478, and a graphical user interface (GUI) 480. The software applications 476 and/or routines 478 may include instructions and steps that when executed by the third processor 438 cause the third controller 470 and/or the router module 484 to coordinate call traffic routing and subscriber management, including a conversion between digital modem traffic from the antenna 418, 419 to Wi-Fi of the end-user mobile devices 450 operatively coupled to the LAN/WLAN 448.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of particular operations may be distributed among the one or more processors, not only residing within a single machine, but deployed across a number of machines. In some example embodiments, the processor or processors may be located in a single location (e.g., within a home environment, an office environment, a mobile platform, or as a server farm), while in other embodiments the processors may be distributed across a number of locations.

The performance of particular operations may be distributed among the one or more processors, not only residing within a single machine, but deployed across a number of machines. In some example embodiments, the one or more processors or processor-implemented modules may be located in a single geographic location (e.g., within a home environment, an office environment, a mobile platform, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," "identifying," "predicting," "analyzing," and the like may refer to actions or processes of a machine (e.g., a computing device) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Still further, for the purposes of illustration only, the figures depict preferred embodiments of a communication system and method for a mobile platform. One skilled in the art will readily recognize from the discussion above that alternative embodiments of the structures and methods illustrated herein may be employed without departing from the principles described herein.

Of course, the applications and benefits of the systems, methods, and techniques described herein are not limited to only the above examples. Many other applications and benefits are possible by using the systems, methods, and techniques described herein.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

Aspect 1: A controller for communicating with a first and second satellite station included among one or more networks of satellite stations, the controller comprising: a first modem communicating with the first satellite station via a first frequency over a first communication link; a map of the one or more networks of satellite stations including the second satellite station; a processor coupled to the first modem, the processor utilizing the map of the one or more networks of satellite stations to determine the second satellite station for communication with the controller; and a second modem coupled to the processor and communicating with the second satellite station via a second frequency over a second communication link, wherein the processor is configured to calculate a time to handoff communication from the first communication link to the second communication link and timely initiate the communication handoff based on the calculated time.

Aspect 2: The controller of aspect 1, wherein the communication handoff from the first communication link to the second communication link is based on a communication indicator.

Aspect 3: The controller of any one of aspects 1-2, further comprising: an antenna coupled to the first modem and positioned toward the first satellite station to facilitate communication with the first satellite station over the first frequency, wherein the processor is configured to position the antenna toward the second satellite station based on the communication handoff.

Aspect 4: The controller of any one of aspects 1-3, wherein the antenna is enclosed within a radome affixed to or integral with the mobile platform.

Aspect 5: The controller of any one of aspects 1-4, wherein the first frequency and the second frequency are the same frequency.

Aspect 6: The controller of any one of aspects 1-5, wherein the first frequency and/or second frequency includes at least a portion of a $K_u$-band, $K_a$-band, or L-band.

Aspect 7: The controller of any one of aspects 1-6, wherein the communication indicator includes at least one of the following: signal strength received at the first modem, signal strength received at the second modem, comparative/relative signal strength received between the first modem and the second modem, and the distance between the mobile communicator and the first and/or second satellite.

Aspect 8: The controller of any one of aspects 1-7, further comprising a memory device coupled to the processor, wherein the map of the one or more networks of satellite stations is stored on the memory device.

Aspect 9: The controller of any one of aspects 1-8, wherein the map of the one or more networks of satellite stations is received at the controller.

Aspect 10: The controller of any one of aspects 1-9, wherein the mobile platform is an air-based transport, a land-based transport, or a sea-based transport.

Aspect 11: The controller of any one of aspects 1-10, wherein at least a portion of the controller is housed within the replaceable line unit attached to the mobile platform.

Aspect 12: The controller of any one of aspects 1-11, wherein the controller is attached to the mobile platform.

Aspect 13: A mobile communicator enabling communication between a mobile platform and a first and second satellite station included among one or more networks of satellite stations, the mobile communicator comprising: a controller fixedly attached to the mobile platform, the controller including a processor, a first modem, a second modem, and a memory device; the first modem facilitating communication via a first communication link and a first frequency between the controller and the first satellite station; a map of the one or more networks of satellite stations including the second satellite station stored in the memory device, wherein the controller utilizes the map of the one or more satellite stations to determine the second satellite station for communicating with the controller; and the second modem facilitating communication via a second communication link and a second frequency between the controller and the second satellite station, wherein the controller is configured to calculate a time to handoff communication from the first communication link to the second communication link timely initiate the communication handoff based on the calculate time.

Aspect 14: The mobile communicator of aspect 13, wherein the communication handoff from the first communication link to the second communication link is based on a communication indicator.

Aspect 15: The mobile communicator of any one of aspects 13-14, further comprising: an antenna capable of being coupled to the first modem or the second modem, wherein the controller positions the antenna for communication with the second satellite station based on the communication handoff.

Aspect 16: The mobile communicator of any one of aspects 13-15, further comprising: an antenna coupled to the first modem, wherein the controller is configured to decouple the antenna from the first modem and couple the antenna to the second modem based on the communication handoff.

Aspect 17: The mobile communicator of any one of aspects 13-16, wherein the first frequency and the second frequency are the same frequency.

Aspect 18: The mobile communicator of any one of aspects 13-17, wherein the first frequency includes at least a portion of a $K_u$-band, $K_a$-band, or L-band.

Aspect 19: The mobile communicator of any one of aspects 13-18, wherein the communication indicator includes at least one of the following: signal strength received at the first modem, signal strength received at the second modem, comparative signal strength received between the first modem and the second modem, and distance between the mobile communicator and the first and/or second satellite.

Aspect 20: The mobile communicator of any one of aspects 13-19, wherein the mobile platform is an air-based transport, a land-based transport, or a sea-based transport.

Aspect 21: The mobile communicator of any one of aspects 13-20, further comprising a replaceable line unit attached to the mobile platform, wherein at least a portion of the controller is housed within the replaceable line unit.

Aspect 22: The mobile communicator of any one of aspects 13-21 coupled to a wireless local area network including an end-user wireless device, wherein the controller is configured to support bi-directional communication to and from the end-user wireless device.

Aspect 23: A mobile communicator for communicating with a first and second satellite station included among one or more networks of satellite stations, the mobile communicator attached to a mobile platform and comprising: an antenna facilitating communication between the mobile communicator and the one or more networks of satellite stations; a first modem coupled to the antenna and configured to communicate with the first satellite station over a first frequency; a memory device storing a map of the one or more networks of satellite stations including the second satellite station; a first controller coupled to the first modem, the first controller utilizing the map of the one or more networks of satellite stations to determine the second satellite station for communication with the mobile communicator; a second modem configured to communicate with the second satellite station over a second frequency, wherein the first controller is configured to calculate a time to handoff communication from the first modem to the second modem and timely initiate the communication handoff based on the calculated time; and a second controller configured to position the antenna toward the second satellite based on the communication handoff.

Aspect 24: The mobile communicator of aspect 23, wherein the communication handoff from the first communication link to the second communication link is based on a communication indicator.

Aspect 25: The mobile communicator of any one of aspects 23-24, wherein the mobile platform is an air-based transport, a land-based transport, or a sea-based transport.

Aspect 26: The mobile communicator of any one of aspects 23-25, wherein the antenna is enclosed within a radome affixed to or integral with to the mobile platform.

Aspect 27: The mobile communicator of any one of aspects 23-26, wherein the first frequency includes one of a $K_u$-band, $K_a$-band, or an L-band.

Aspect 28: The mobile communicator of any one of aspects 23-27, wherein the communication indicator includes one or more of the following: signal strength received at the first modem, signal strength received at the second modem, comparative signal strength received between the first modem and the second modem, and the distance between the mobile communicator and the first and/or second satellite.

Aspect 29: The mobile communicator of any one of aspects 23-28 coupled to a wireless local area network including an end-user wireless device, wherein the first controller or the second controller is configured to support bi-directional communication to and from the end-user wireless device.

Aspect 30: A method of communicating between a controller mounted to a mobile platform and a pair of satellite stations included among one or more networks of satellite stations, the method comprising: utilizing a first modem and establishing, via one or more processors, a first communication link between the controller and a first satellite station; utilizing one or more maps of the one or more networks of satellite stations and determining, via one or more processors, a second satellite station for communication with the controller; utilizing a second modem and establishing, via one or more processors, a second communication link between the controller and the second satellite station; calculating, via one or more processors, a time to handoff communication from the first communication link to the second communication link based on the analysis of the one or more communication indicators; preparing, via one or more processors, the first and second modems for the communication handoff from the first communication link to the second communication link; and, initiating the communication handoff, via one or more processors, based on the calculated time.

Aspect 31: The method of aspect 30, further comprising: receiving, via one or more processors, one or more communication indicators; and analyzing, via one or more processors, the one or more communication indicators, wherein the communication handoff is based on the analyzed one or more communication indicators.

Aspect 32: The method of any of aspects 30-31, further comprising: terminating, via one or more processors, the first communication link; and coupling, via one or more processors, an antenna to the second communication link.

Aspect 33: The method of any one of aspects 30-32 further comprising: positioning, via one or more processors, the antenna toward the second satellite station to improve communication over the second communication link.

Aspect 34: The method of any one of aspects 30-33, further comprising: communicating with the first or second satellite station over a frequency band that includes one of a $K_u$-band, $K_a$-band, or L-band.

Aspect 35: The method of any one of aspects 30-34, wherein calculating a time to handoff communication includes determining a distance from the mobile communicator to the second satellite station.

Aspect 36: The method of any one of aspects 30-35, wherein calculating a time to handoff communication includes at least one of the following: evaluating signal strength received at the first modem, evaluating signal strength received at the second modem, comparing signal strength of the first and second communication links, and comparing distance between the mobile platform and the first satellite station to distance between the mobile platform and the second satellite station.

Aspect 37: The method of any one of aspects 30-36, further comprising: supporting, via one or more processors, bi-directional communication to and from an end-user wireless device.

What is claimed:

1. A method of communicating between an end-user device positioned within a mobile platform and a pair of satellite stations included among one or more networks of satellite stations, the method comprising:
    utilizing a first modem and establishing, via one or more processors, a first communication link between the end-user device and a first satellite station;
    utilizing one or more maps of the one or more networks of satellite stations and determining, via the one or more processors, a second satellite station for communication with the end-user device;
    utilizing a second modem and establishing, via the one or more processors, a second communication link between the end-user device and the second satellite station;
    calculating, via the one or more processors, a time to initiate communication handoff from the first communication link to the second communication link; and, initiating the communication handoff, via the one or more processors, based on the calculated time.

2. The method of communicating of claim 1, further comprising:
  terminating, via one or more processors, the first communication link;
  coupling, via one or more processors, an antenna to the second communication link; and
  positioning, via one or more processors, the antenna toward the second satellite station to improve communication over the second communication link.

3. The method of communicating of claim 1, wherein calculating a time to initiate communication handoff includes at least one of the following: determining a distance from the mobile platform to the second satellite station; evaluating signal strength received at the first modem, evaluating signal strength received at the second modem, comparing signal strength of the first and second communication links, and comparing distance between the mobile platform and the first satellite station to distance between the mobile platform and the second satellite station.

4. The method of communicating of claim 1, further comprising:
  receiving, via one or more processors, one or more communication indicators;
  analyzing, via one or more processors, the one or more communication indicators, wherein calculating the time to initiate communication handoff from the first communication link to the second communication link based on the analysis of the one or more communication indicators.

5. The method of communicating of claim 4, wherein the one or more communication indicator includes at least one of the following: signal strength received at the first modem, signal strength received at the second modem, comparative/relative signal strength received between the first modem and the second modem, and a distance between the mobile platform and the first and/or second satellite.

6. The method of communicating of claim 1, wherein the first and/or second communication link includes a wireless local area network (WLAN).

7. A controller for facilitating communication between an end-user device and a first and second satellite station included among one or more networks of satellite stations, the controller attached to a mobile platform and comprising:
  a first modem communicating with the first satellite station via a first frequency over a first communication link;
  one or more maps of the one or more networks of satellite stations including the second satellite station;
  a processor coupled to the first modem, the processor utilizing the one or more maps of the one or more networks of satellite stations to determine the second satellite station for communication with the end-user device; and
  a second modem coupled to the processor and communicating with the second satellite station via a second frequency over a second communication link, wherein the processor is configured to calculate a time to initiate communication handoff from the first communication link to the second communication link.

8. The controller of claim 7, wherein the calculated time to initiate communication handoff from the first communication link to the second communication link is based on analysis by the processor of a communication indicator.

9. The controller of claim 8, wherein the communication indicator includes at least one of the following: signal strength received at the first modem, signal strength received at the second modem, comparative/relative signal strength received between the first modem and the second modem, and a distance between the mobile platform and the first and/or second satellite.

10. The controller of claim 7, further comprising:
  an antenna coupled to the first modem and positioned toward the first satellite station to facilitate communication with the first satellite station over the first frequency, wherein the processor is configured to position the antenna toward the second satellite station based on the calculated time to initiate communication handoff.

11. The controller of claim 10, wherein the antenna is enclosed within a radome affixed to or integral with the mobile platform.

12. The controller of claim 7, wherein the first frequency and/or second frequency includes at least a portion of a $K_u$-band, $K_a$-band, or L-band.

13. The controller of claim 7, wherein the first and/or second communication link includes a wireless local area network (WLAN).

14. The controller of claim 7, wherein the mobile platform is an air-based transport, a land-based transport, or a sea-based transport.

15. The controller of claim 7, further comprising a replaceable line unit attached to the mobile platform, wherein at least a portion of the controller is housed within the replaceable line unit.

16. A mobile communicator enabling communication between an end-user device positioned on a mobile platform and a first and second satellite station included among one or more networks of satellite stations, the mobile communicator comprising:
  a controller attached to the mobile platform, the controller including a processor, a first modem, a second modem, and a memory device operatively coupled together;
  a wireless local area network (WLAN) coupled to the first modem and the second modem;
  the first modem facilitating communication via a first communication link including the wireless local area network (WLAN) between the end-user device and the first satellite station;
  one or more maps of the one or more networks of satellite stations including the second satellite station stored in the memory device, wherein the processor utilizes the one or more maps of the one or more satellite stations to determine the second satellite station for communicating with the end-user device; and
  the second modem facilitating communication via a second communication link including the wireless local area network (WLAN) and between the end-user device and the second satellite station, wherein the processor is configured to calculate a time to initiate communication handoff from the first communication link to the second communication link.

17. The mobile communicator of claim 16, wherein the calculated time to initiate communication handoff from the first communication link to the second communication link is based on analysis by the processor of a communication indicator, wherein the communication indicator includes at least one of the following: signal strength received at the first modem, signal strength received at the second modem, comparative/relative signal strength received between the first modem and the second modem, and a distance between the mobile communicator and the first and/or second satellite.

18. The mobile communicator of claim 16, further comprising:
    an antenna capable of being coupled to the first modem or the second modem, wherein the controller positions the antenna for communication with the second satellite station based on the calculated time to initiate communication handoff from the first communication link to the second communication link.

19. The mobile communicator of claim 16, further comprising:
    an antenna coupled to the first modem, wherein the controller is configured to decouple the antenna from the first modem and couple the antenna to the second modem based on the calculated time to initiate communication handoff from the first communication link to the second communication link.

20. The mobile communicator of claim 16, wherein the controller is configured to support bi-directional communication to and from the end-user wireless device.

\* \* \* \* \*